(12) United States Patent
Dantsker et al.

(10) Patent No.: US 6,499,499 B2
(45) Date of Patent: Dec. 31, 2002

(54) FLOW CONTROL IN MULTI-STREAM MICROFLUIDIC DEVICES

(75) Inventors: Eugene Dantsker, Sierra Madre, CA (US); Christoph D. Karp, Pasadena, CA (US); Marci Pezzuto, Altadena, CA (US); Steven E. Hobbs, West Hills, CA (US); Paren P. Patel, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 0 days.

(21) Appl. No.: 09/962,034

(22) Filed: Sep. 25, 2001

(65) Prior Publication Data

US 2002/0153046 A1 Oct. 24, 2002

Related U.S. Application Data

(63) Continuation-in-part of application No. 09/839,547, filed on Apr. 20, 2001.

(51) Int. Cl.[7] .............................. F15C 1/06; F15B 21/00
(52) U.S. Cl. ................... 137/1; 137/803; 137/828; 137/833
(58) Field of Search ................ 137/833, 803, 137/828, 1, 14

(56) References Cited

U.S. PATENT DOCUMENTS

| 3,568,692 A | * | 3/1971 | Metzger et al. | |
| 3,680,576 A | * | 8/1972 | Kiwak | 137/833 |
| 3,783,902 A | * | 1/1974 | Schwarz et al. | 137/803 |
| 5,922,591 A | | 7/1999 | Anderson et al. | 435/287.2 |
| 6,043,080 A | | 3/2000 | Lipshutz et al. | 435/287.2 |
| 6,074,725 A | | 6/2000 | Kennedy | 428/188 |
| 6,193,471 B1 | | 2/2001 | Paul | 417/53 |
| 6,296,020 B1 | | 10/2001 | McNeely et al. | 137/806 |

FOREIGN PATENT DOCUMENTS

| DE | 197 39 722 | 9/1997 | ............ H05K/3/36 |
| WO | WO 99/19717 | 4/1999 | ........... G01N/25/22 |
| WO | WO 99/60397 | 11/1999 | ......... G01N/33/483 |
| WO | WO 01/04909 | 1/2001 | ............. G25N/9/00 |
| WO | WO 01/07506 | 2/2001 | .............. C08J/5/00 |
| WO | WO 01/09598 | 2/2001 | ........... G01N/27/26 |

OTHER PUBLICATIONS

Merkel, Tobias, et al., "A New Technology for Fluidic Microsystems Based on PCB Technology," Sensors and Actuators 77 A:Physical, pp.98–105, 1999.

Ngola, Sarah M., et al., "Conduct–as–Cast Polymer Monoliths as Separation Media for Capillary Electrochromatography," Analytical Chemistry, vol. 73, No. 5, pp. 849–856, Mar. 1, 2001.

* cited by examiner

Primary Examiner—A. Michael Chambers
(74) Attorney, Agent, or Firm—Vincent K. Gustafson; Michael F. Labbee

(57) ABSTRACT

Microfluidic devices for splitting an established fluidic flow through a microfluidic channel among multiple downstream microfluidic channels include a plurality of elevated flow resistance regions to promote precise and predictable splitting. Each elevated resistance region imparts a flow resistance that is substantially greater than the characteristic resistance to established flow of its associated downstream channel. Elevated flow resistance regions may include one or more porous materials and/or alterations to the channel geometry of at least a portion of a downstream channel.

31 Claims, 11 Drawing Sheets

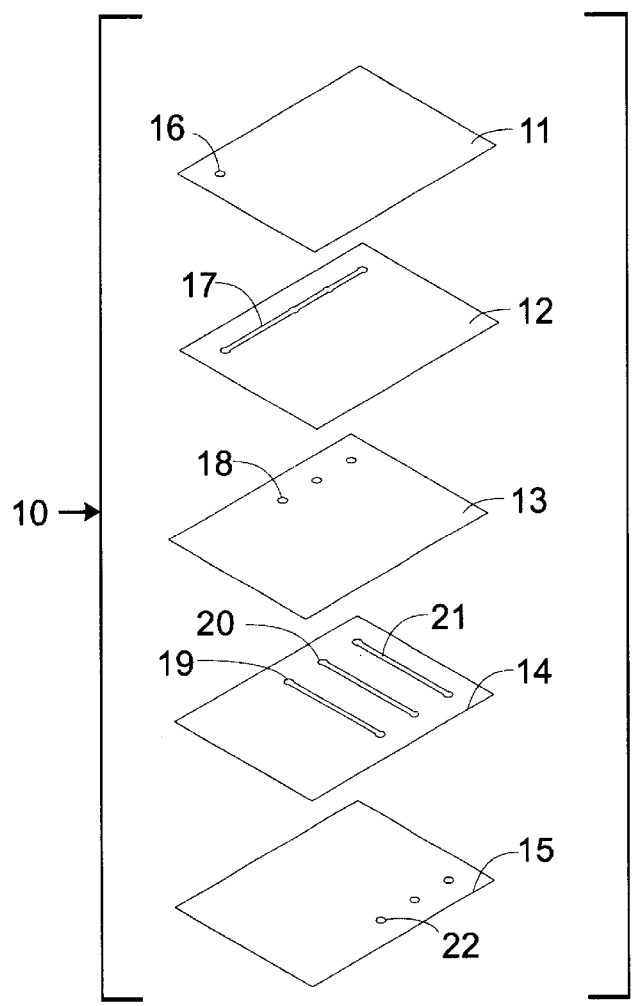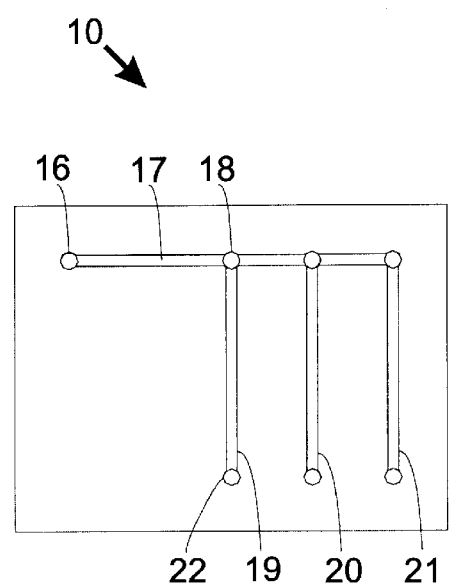
FIG._1A
FIG._1B

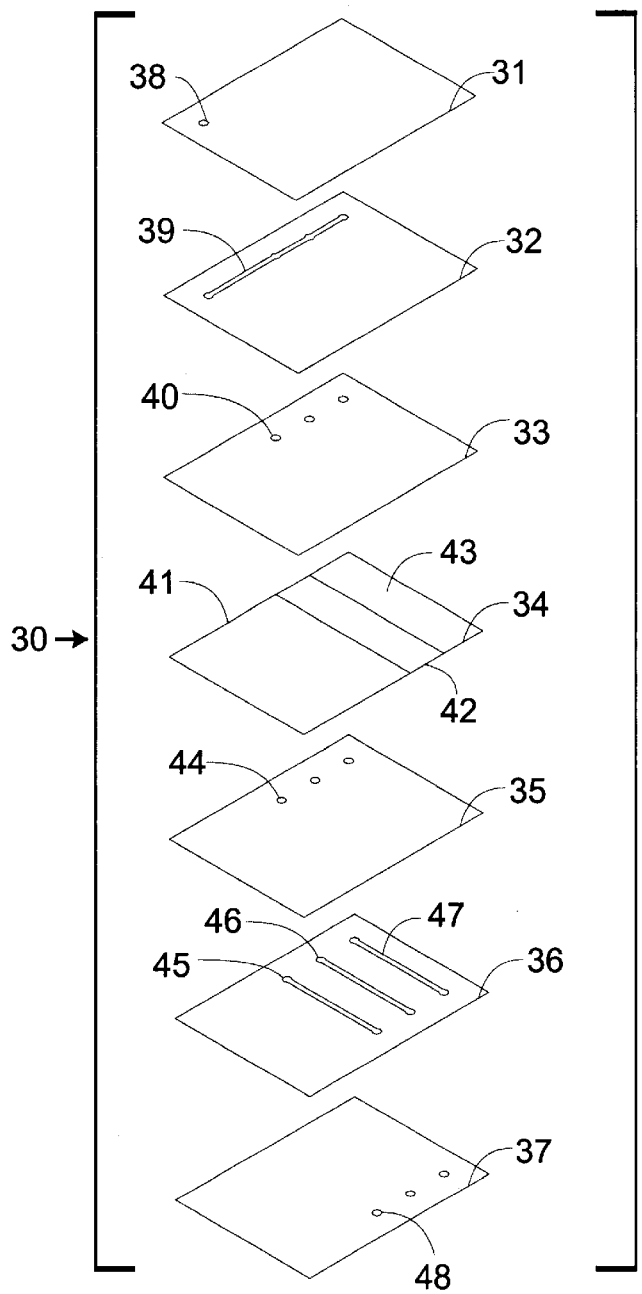
FIG._2A
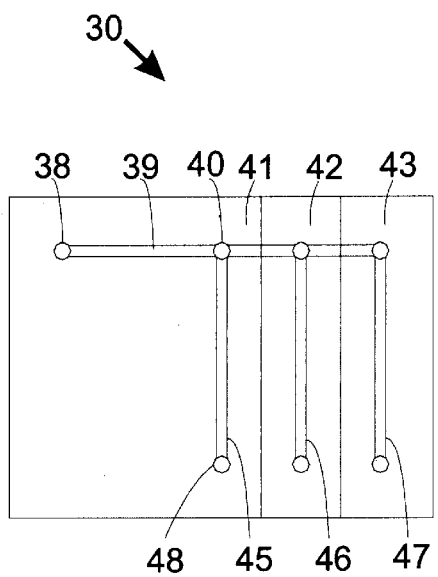
FIG._2B

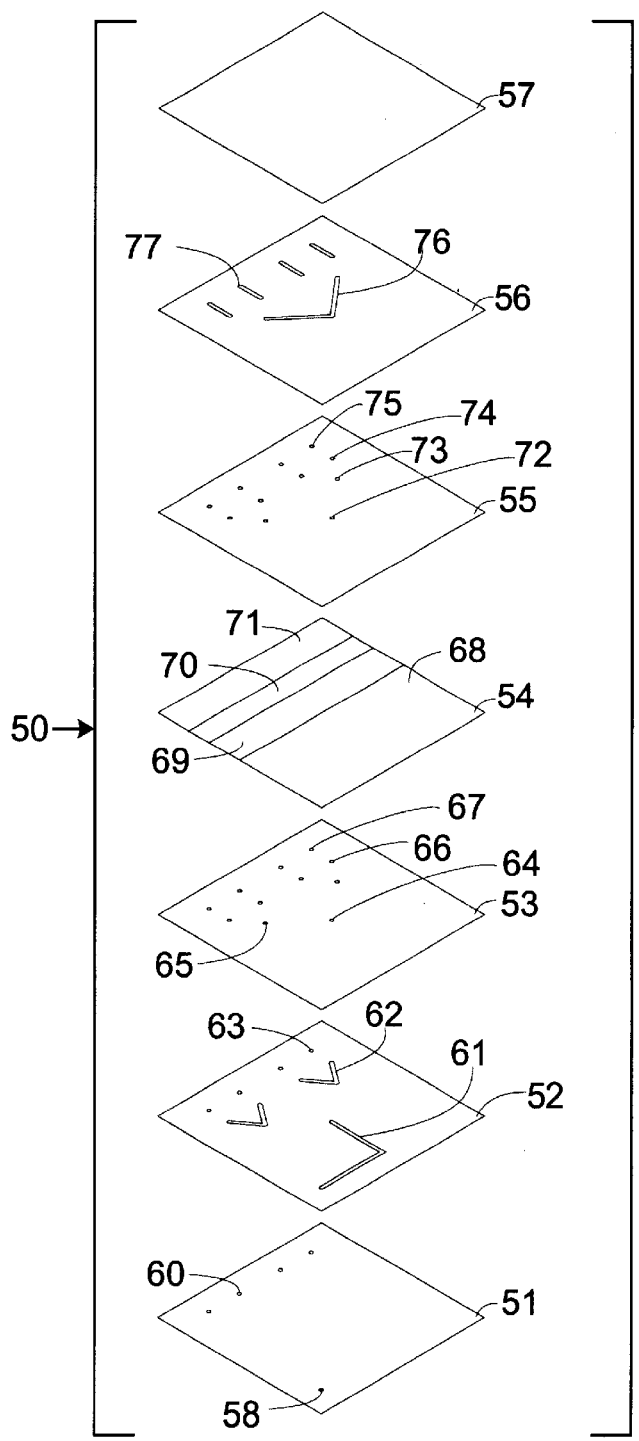
FIG._3A
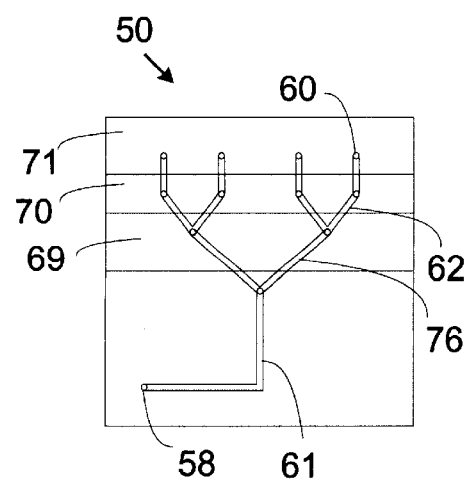
FIG._3B

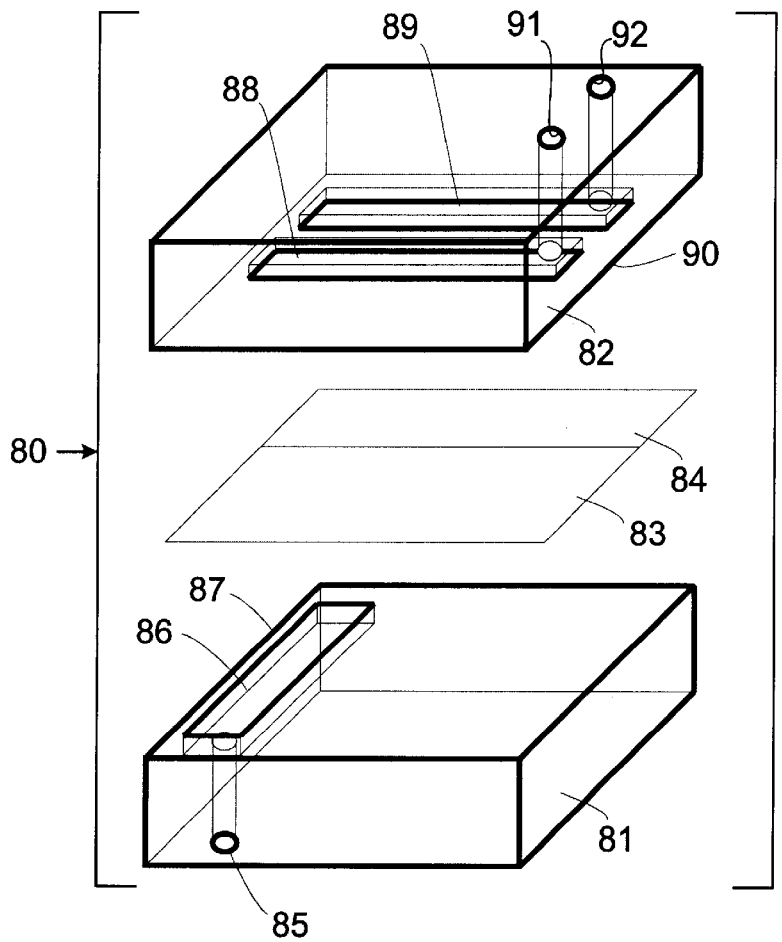
FIG._4A
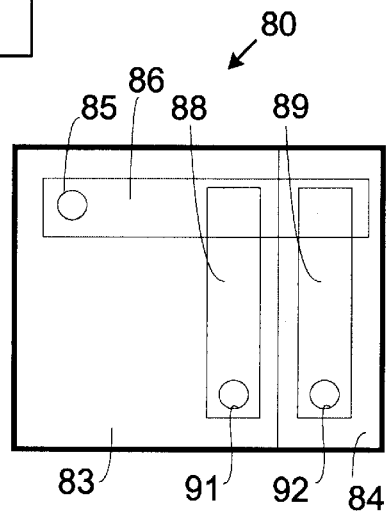
FIG._4B

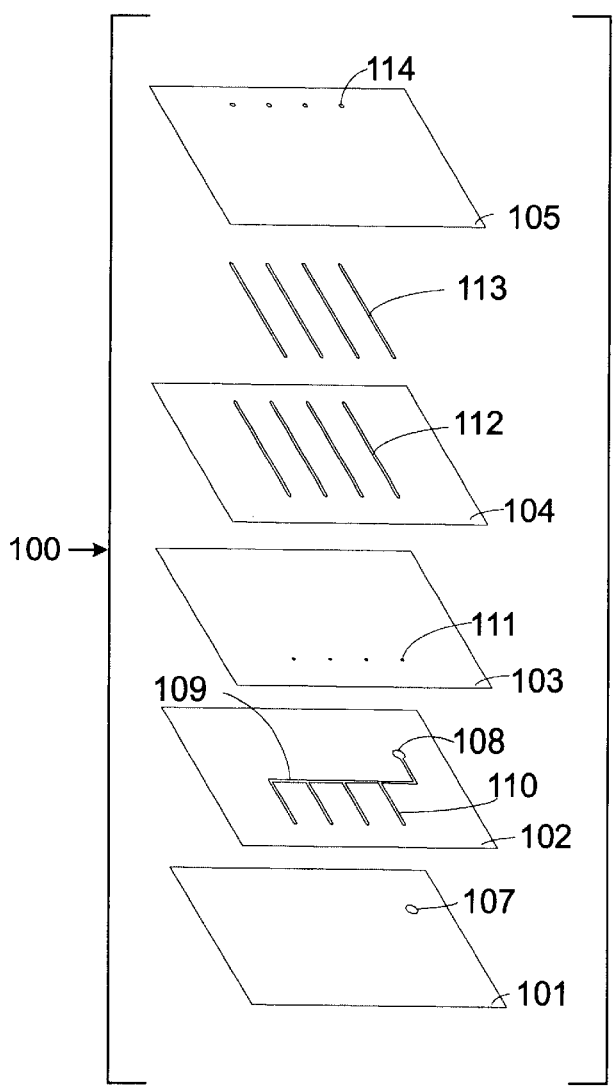
FIG._5A
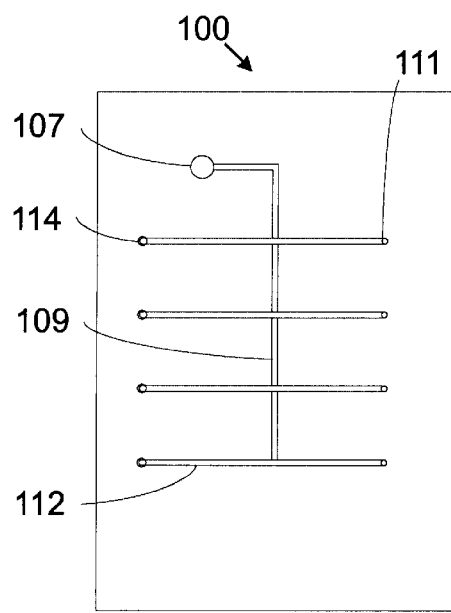
FIG._5B
FIG._5C

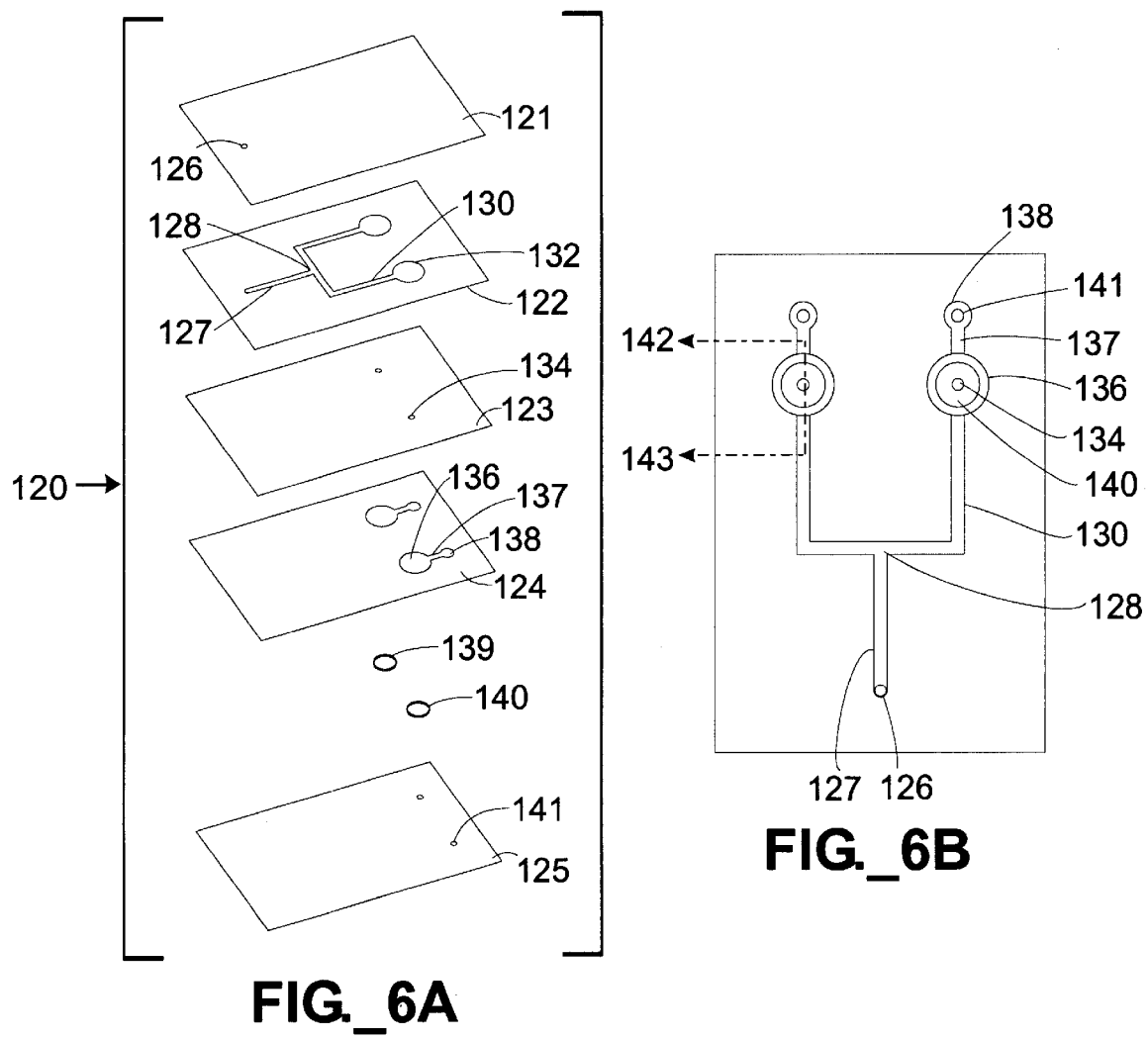
FIG._6A
FIG._6B
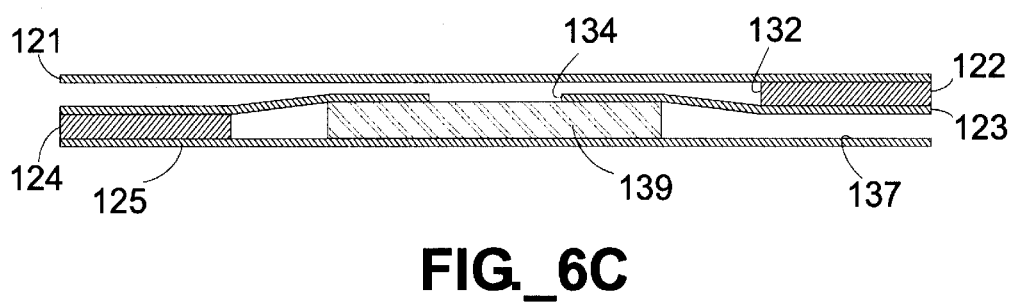
FIG._6C

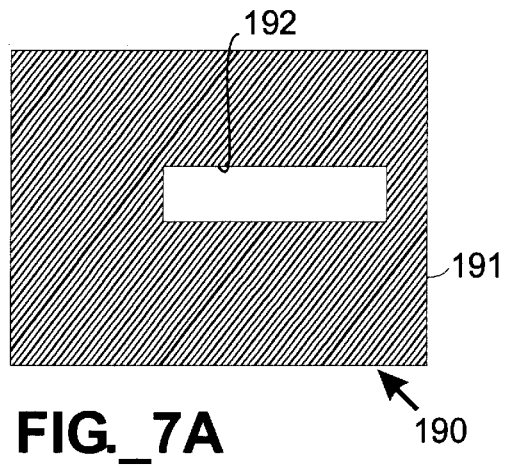
FIG._7A
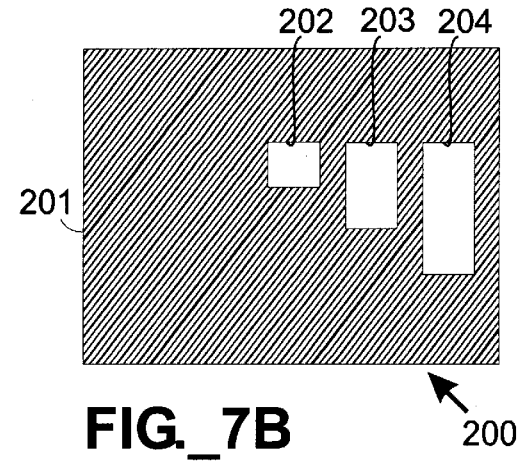
FIG._7B
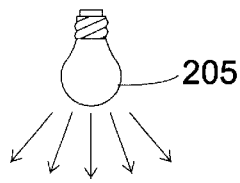
FIG._7C
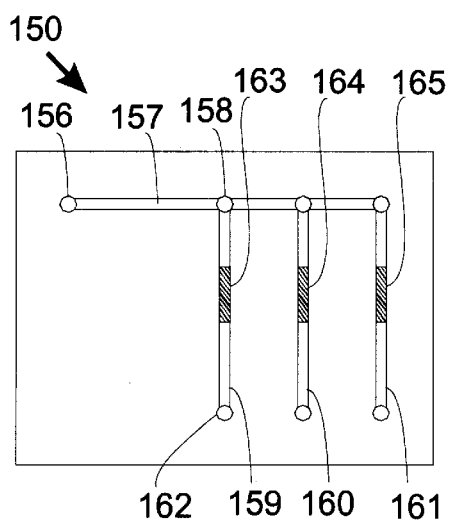
FIG._7D
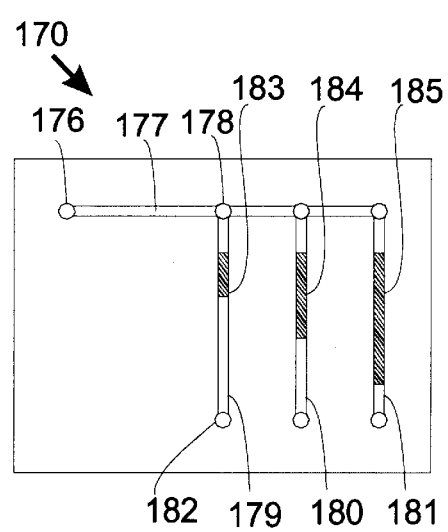
FIG._7E

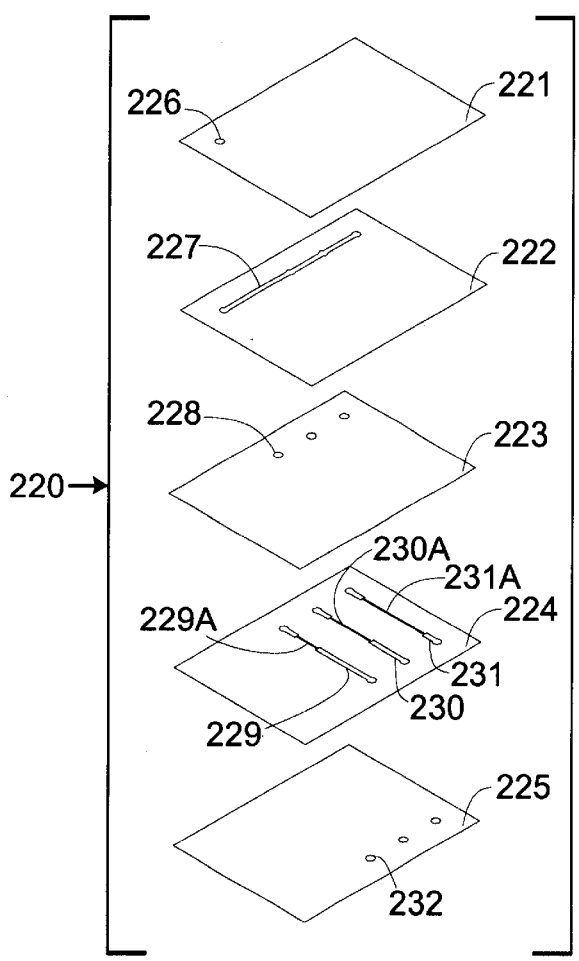
FIG._8A
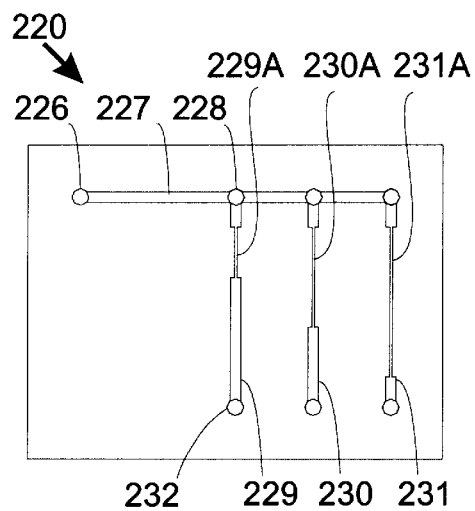
FIG._8B
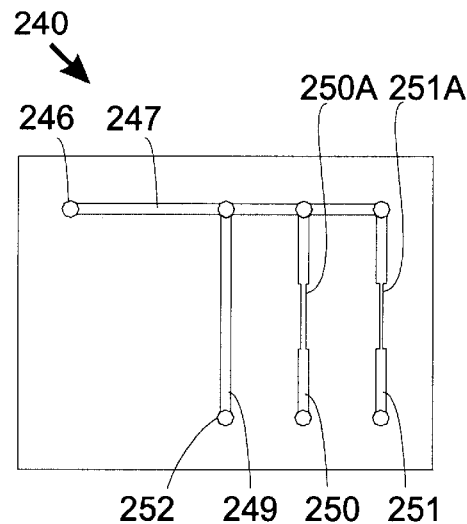
FIG._8C

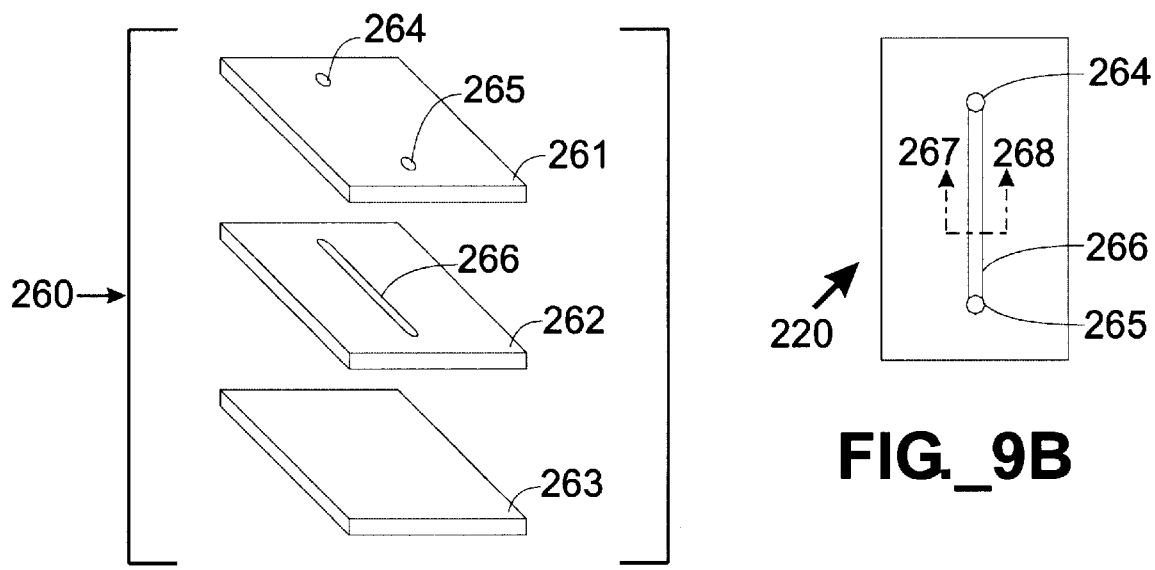
FIG._9B
FIG._9A
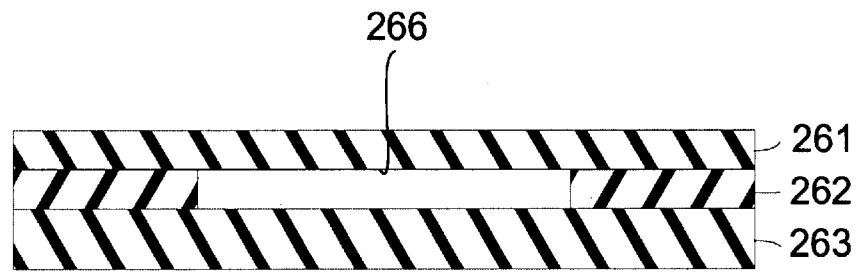
FIG._9C
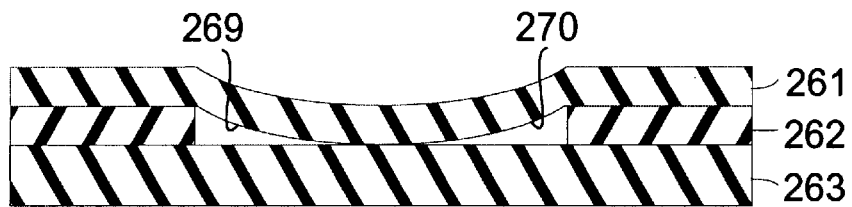
FIG._9D

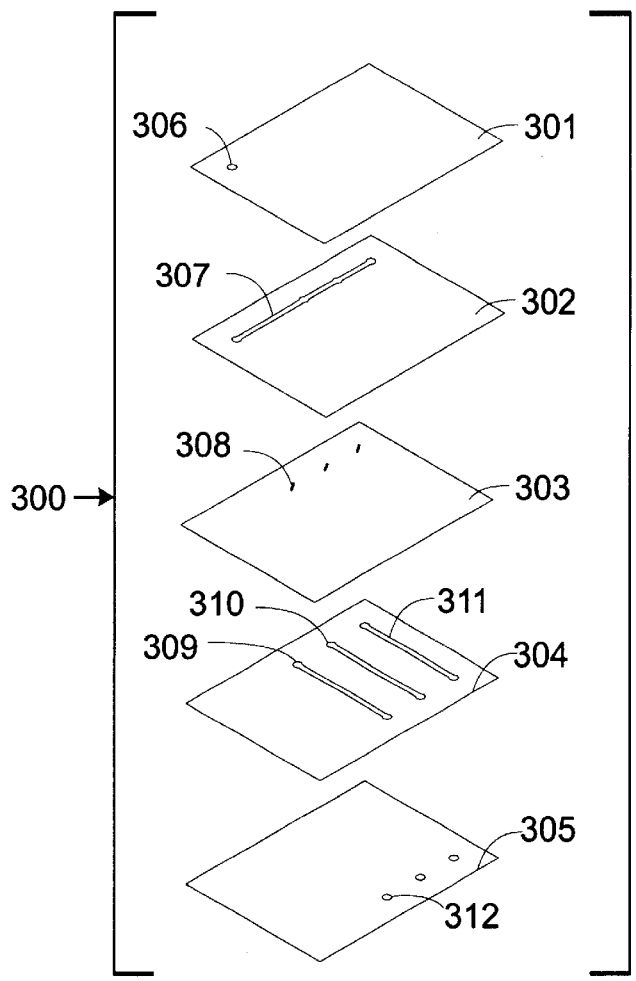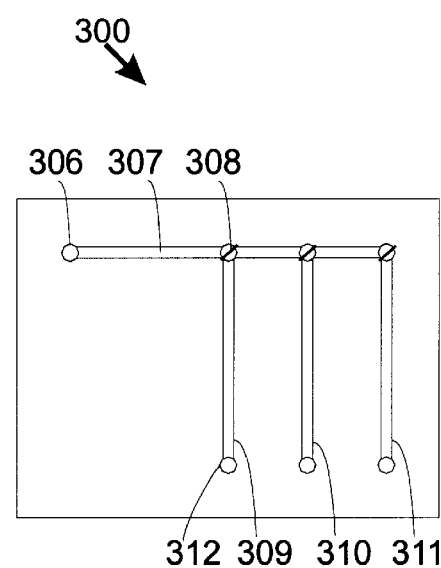
FIG._10A
FIG._10B

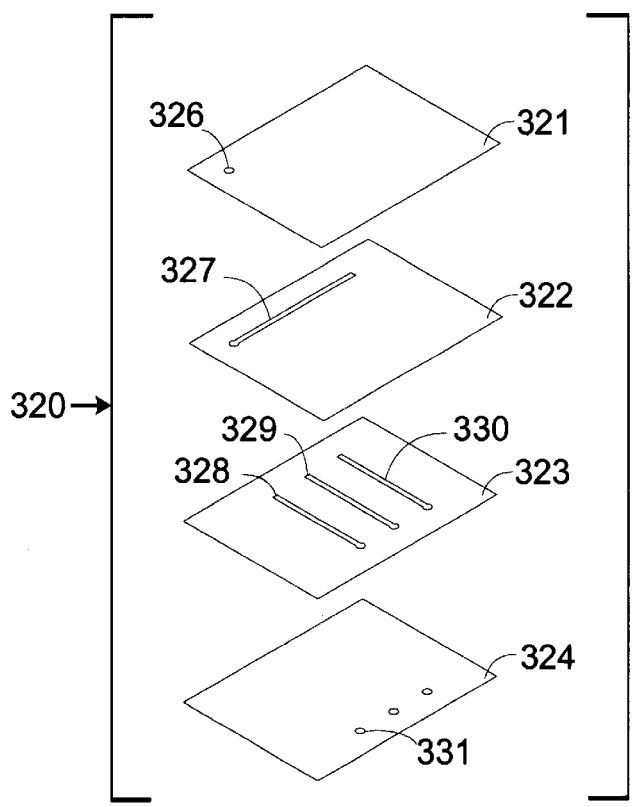
FIG._11A
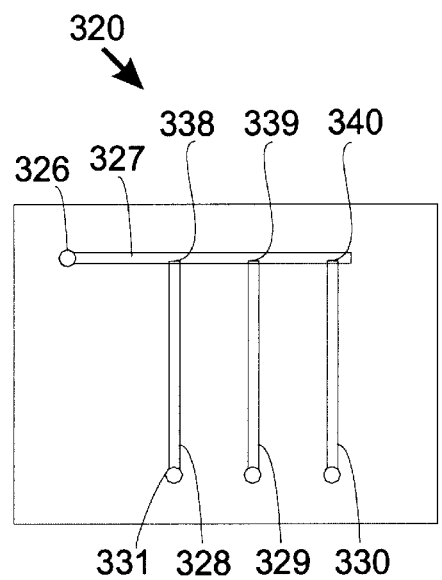
FIG._11B

FLOW CONTROL IN MULTI-STREAM MICROFLUIDIC DEVICES

STATEMENT OF RELATED APPLICATION(S)

This is a continuation-in-part of co-pending U.S. application Ser. No. 09/839,547 (filed Apr. 20, 2001), which is incorporated by reference herein.

FIELD OF THE INVENTION

The present invention relates to passive control of fluid flow through microfluidic conduits.

BACKGROUND OF THE INVENTION

There has been a growing interest in the application of microfluidic systems to a variety of technical areas. For example, use of microfluidic systems for the acquisition of chemical and biological information presents certain advantages. In particular, when conducted in microfluidic volumes, complicated biochemical reactions and processes may be carried out using very small volumes of fluid. In addition to minimizing sample volume, microfluidic systems increase the response time of reactions and lower reagent consumption. Furthermore, when conducted in microfluidic volumes, a large number of complicated biochemical reactions and/or processes may be carried out (whether in serial, in parallel, or multiplexed) in a small area, such as in a single integrated device.

In the interest of minimizing the number of external interfaces to a microfluidic device having a number of fluidic circuits, it is often desirable to split a fluid flow from a single microfluidic channel into multiple channels. Beyond providing mere splitting utility, however, it would be further desirable to split flowing streams of fluid into precise and predictable proportions within a microfluidic device. Providing precise and predictable microfluidic flows can be particularly valuable in performing reactions such as chemical or biological synthesis, for example.

Generally, flow within a fluid conduit takes the path of least resistance to flow. Further generally, fluidic channels have a characteristic flow resistance that depends on factors including geometry and surface chemistry, and this characteristic flow resistance may not be easily controllable or reproducible from channel to channel within a device. The difficulty in controlling or reproducing the characteristic flow resistance is likely due in substantial part to the high surface-to-volume ratio in a microfluidic channel. It is believed that this high ratio significantly magnifies the effect of surface interactions between microscopic volumes of fluid and their associated microfluidic conduits. Thus, even slight variations in flow resistance between seemingly identical microfluidic channels receiving fluid from a common splitter may have a tangible impact on the proportion of fluid flowing in the respective channels.

A method of controlling fluid flow through microchannels by using stopping means has been proposed by McNeely, et al., in WIPO International Application Number PCT/US99123729 (Publication Number WO 00/22436), published Apr. 20, 2000. There, passive stopping means act as pressure barriers to stop fluid flow until enough pressure is generated to push the fluid past the stopping means. McNeely, et al., is specifically directed to controlling developing flow (an advancing stream of fluid having a moving interface of liquid and gas), however, as opposed to established flow (where there is no moving meniscus and all surfaces are significantly wetted). Since the stopping means advantageously have negligible effect on established flow within the channels, they are ill-suited for splitting flowing streams of fluid into precise and predictable proportions.

Accordingly, there exists a need for devices and methods capable of precisely and predictably splitting established flows of fluids.

SUMMARY OF THE INVENTION

This invention relates to built-in means for controlling fluid flow in microfluidic devices. In one aspect of the invention, a method for precisely splitting an established fluidic flow through an upstream microfluidic channel among a plurality of downstream microfluidic channels includes the step of substantially and permanently elevating the flow resistance of each downstream channel relative to its characteristic resistance to established flow.

In another aspect of the invention, a microfluidic device includes an upstream channel containing a first established flow, a plurality of downstream channels in fluid communication with the upstream channel, a plurality of regions of permanently elevated resistance to established flow, each elevated flow resistance region associated with one of the plurality of downstream channels. Each elevated resistance region imparts a flow resistance that is substantially greater than the characteristic resistance to established flow of its associated downstream channel.

These and other aspects and advantages of the present invention will become apparent from the following detailed description of the preferred embodiments taken in conjunction with the figures.

Definitions

The term "channel" or "chamber" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which fluids may be directed. Such a fluid cavity may, for example, comprise a flow-through cell where fluid is to be continually passed or, alternatively, a chamber for holding a specified, discrete amount of fluid for a specified amount of time. "Channels" and "chambers" may be filled with or may contain internal structures comprising, for example, valves, filters, or equivalent components and materials. A microfluidic channel has a smallest dimension that is at least about 1 micron but is less than about 500 microns.

The term "circuit" or "fluidic circuit" as used herein refers to a fluidic path that may include one or more fluidic channels or other structures, such as may be formed in a microfluidic device and any associated fluidic interface.

The term "flow resistance" refers to a resistance to an established fluid flow (as opposed to the term "static resistance" that would apply to a developing fluid flow). Given that flow resistance may vary with pressure, one measure of flow resistance might be the local slope of a graph of pressure versus flow rate. Since the present invention involves elevation of flow resistance, however, relative measures of flow resistance are more pertinent than absolute measures. The magnitude of a characteristic flow resistance (associated with an unmodified microfluidic channel or fluid circuit) relative to an elevated flow resistance (associated with a modified microfluidic channel or fluid circuit) may be obtained by the following procedure: (1) flowing an established flow of fluid at a constant (e.g. regulated) pressure through an unmodified microfluidic circuit, capturing the exiting fluid, and calculating the flow rate (from measured volumetric output over time); (2) flowing an established flow of fluid at the same constant pressure through a modified circuit having an elevated flow resistance and calculating the flow rate (from measured volumetric output over time); and (3) comparing the original flow rate to the modified flow rate. Original flow rate divided by the modified flow rate yields a flow resistance factor. For example, if the modified flow rate is equal to only one-third of the original flow rate, then the flow resistance factor would be 3. A slightly different situation is the comparison of flow resistances between adjacent channels each positioned downstream of a common splitter. If a single upstream channel communicates an established flow of fluid to multiple downstream channels (each subject to an equal backpressure, such as by connecting them to a common vent), then the relative magnitude of the flow resistance for each downstream channel may be inferred by the amount of fluid flowing through each downstream channel.

The term "characteristic flow resistance" refers to the resistance to established flow that is exhibited by an unmodified microfluidic channel or fluid circuit. Flow resistance may be elevated by various means, such as, for example, by adding a porous material to a channel or fluid circuit, or by significantly reducing one or more dimensions of a channel region.

The term "microfluidic" as used herein is to be understood, without any restriction thereto, to refer to structures or devices through which a fluid is capable of being passed or directed, wherein one or more of the dimensions is less than about 500 microns. The construction of microfluidic devices is described in co-pending applications, U.S. patent application Ser. Nos. 09/550,184 and 09/453,029, the entire contents of which are incorporated herein by reference. Such disclosures are also provided in two WIPO PCT patent applications, nos. PCT/US00/27366 and PCT/US00/27313, which were published on Apr. 12, 2001.

The term "overlap region" refers to a fluidic passage between different, preferably adjacent, layers of a microfluidic device. Channels in non-adjacent layers may meet at an overlap region and be in fluid communication, such as across a porous layer disposed between the non-adjacent layers.

The term "permanently elevated" as used herein and applied to the elevation of flow resistance refers to a substantially non-reversible elevation. Preferably, flow resistance of a particular channel or fluidic circuit is permanently elevated during the manufacture of a microfluidic device. This is to be distinguished from a temporary elevation of flow resistance by reversible elevation means (e.g. a reversible valve) applied to a microfluidic channel.

The term "stencil" as used herein refers to a preferably substantially planar material from which one or more variously shaped and oriented portions are cut (or otherwise removed) through the thickness of the material layer to form microstructures. The outlines of the cut or removed portions comprise the lateral boundaries of microstructures that are formed by sandwiching one or more stencil layers between other stencils and/or substrates.

The term "via" refers to a fluidic passage between non-adjacent layers of a microfluidic device. A simple via may include an aperture defined in a device layer that is sandwiched between other layers. A via is preferably aligned with one or more fluidic channels, chambers, or other vias. A via may be smaller, larger, or the same size as channels or vias defined in one or more adjacent device layers.

BRIEF DESCRIPTION OF THE DRAWINGS

FIG. 1A is an exploded perspective view of a five-layer microfluidic device defining a three-way splitter lacking elevated flow resistance regions. FIG. 1B is a top view of the assembled device of FIG. 1A.

FIG. 2A is an exploded perspective view of a seven-layer microfluidic device defining a three-way splitter and including three porous membrane flow resistance regions each associated with one downstream channel. FIG. 2B is a top view of the assembled device of FIG. 2A.

FIG. 3A is an exploded perspective view of a seven-layer microfluidic serial splitting device having integral flow resistance layer regions each associated with one downstream channel to provide flow resistance. FIG. 3B is a top view of the assembled device of FIG. 3A.

FIG. 4A is an exploded perspective view of a microfluidic splitting device fabricated according to conventional micromachining techniques and including integral flow resistance layer regions each associated with one downstream channel to provide flow resistance. FIG. 4B is a top view of the assembled microfluidic device of FIG. 4A.

FIG. 5A is an exploded perspective view of a five-layer microfluidic device defining a four-way splitter and including four equal-length flow resistance elements each associated with one downstream channel. FIG. 5B is a top view of the assembled device of FIG. 5A. FIG. 5C is a perspective view of four unequal-length flow resistance elements that may be substituted for the equal-length flow resistance elements in the microfluidic device according to FIGS. 5A–5B.

FIG. 6A is an exploded perspective view of a five-layer microfluidic device defining a two-way splitter and including two interference-fit flow resistance elements each associated with one downstream channel. FIG. 6B is a top view of the assembled device of FIG. 6A. FIG. 6C is a partial side sectional view of the assembled device of FIG. 6A along section lines 142–143.

FIG. 7A is a top view of a first photomask useful for preparing equal-length polymerized monolithic flow resistance regions in microfluidic channels. FIG. 7B is a top view of a second photomask useful for preparing unequal-length polymerized monolithic flow resistance regions in microfluidic channels. FIG. 7C is a side schematic view of an ultraviolet radiation source supplying radiation to selective regions of a microfluidic device according to FIGS. 1A–1B through a photomask according to FIG. 7A or 7B. FIG. 7D is a top view of a microfluidic splitting device prepared with the photomask of FIG. 7A, the device defining a three-way splitter and having three equal-length polymerized monolithic flow resistance regions each associated with one downstream channel. FIG. 7E is a top view of a microfluidic splitting device prepared with the photomask of FIG. 7B, the device defining a three-way splitter and having three unequal-length polymerized monolithic flow resistance regions each associated with one downstream channel.

FIG. 8A is an exploded perspective view of a five-layer microfluidic device defining a three-way splitter and including three unequal-length narrowed-width flow resistance regions each having the same width and being associated with one downstream channel. FIG. 8B is a top view of the assembled device of FIG. 8A. FIG. 8C is a top view a microfluidic splitting device similar to the device of FIGS. 8A–8B, but having two equal-length narrowed-width flow resistance regions of different widths each associated with one channel.

FIG. 9A is an exploded perspective view of a microfluidic channel defined in a three-layer device. FIG. 9B is a top view of the device of FIG. 9A. FIG. 9C is a sectional view of the device of FIGS. 9A–9B along section lines 267–268 before collapse of the microfluidic channel. FIG. 9D is a sectional view of the device of FIGS. 9A–9B along section lines 267–268 following collapse of the microfluidic channel.

FIG. 10A is an exploded perspective view of a five-layer microfluidic splitting device defining a three-way splitter and including three narrow slit regions each associated with one downstream channel. FIG. 10B is a top view of the assembled device of FIG. 10A.

FIG. 11A is an exploded perspective view of a four-layer microfluidic splitting device defining a three-way splitter and including three overlap regions each associated with one downstream channel. FIG. 11B is a top view of the assembled device of FIG. 11A.

DETAILED DESCRIPTION OF PREFERRED EMBODIMENTS OF THE INVENTION

This invention describes microfluidic devices that contain regions of permanently elevated flow resistance to facilitate precise and predictable splitting of established fluid flows. In a preferred embodiment, a network of microfluidic channels is constructed so that an established flow of fluid in an upstream channel is split and provided to a plurality of downstream channels each having a permanently elevated flow resistance. Preferably, the flow resistance of each downstream channel is elevated to a level significantly higher than its characteristic flow resistance. The elevated flow resistance regions according to the present invention provide a non-negligible pressure drop. In one embodiment, the flow resistances of several channels downstream of a common splitter are elevated to substantially equal levels to promote substantially even splitting among those channels. In another embodiment, the flow resistances of multiple channels downstream of a common splitter are elevated to unequal levels to promote uneven, yet predictable, splitting between those channels. It is assumed that intentionally added elevated flow resistance regions are significantly more reproducible than characteristic flow resistances of unmodified microfluidic channels or circuits.

Generally, fluid flows from regions of high pressure to low-pressure regions. Fluid flows in microfluidic devices according to the present invention may be induced by various means. For example, fluid flow may be motivated by syringe pumps, peristaltic pumps, or other conventional pumping means, induced by connection to an external pressure reservoir or vacuum source, or induced by gravity. Additionally, electrokinetic means such as electrophoresis or electroosmosis may be used to motivate fluid flow.

I. Fabrication of Microfluidic Devices

Microfluidic devices suitable for containing elevated flow resistance regions according to the present invention may be fabricated in various ways using a wide variety of materials. In a preferred embodiment, microfluidic devices according to the present invention are constructed using stencil layers to define channels and/or chambers. As described in further detail in co-pending U.S. application Ser. No. 09/453,029, a stencil layer is preferably substantially planar and has a channel or chamber cut through the layer. For example, a computer-controlled plotter modified to accept a cutting blade may be used. Alternatively, a computer-controlled laser cutter may be used. As further alternatives, conventional stamping, cutting, and/or molding technologies may be employed. The wide variety of materials that may be used to fabricate microfluidic devices using sandwiched stencil layers include polymeric, metallic, and/or composite materials, to name a few.

When assembled in a microfluidic device, the top and bottom surfaces of stencil layers may mate with one or more adjacent stencil or substrate layers to form a closed device. In one embodiment, one or more layers of a device are comprised of single- or double-sided adhesive tape, although other methods of adhering stencil layers may be used. A portion of the tape (of the desired shape and dimensions) can be cut and removed to form channels, chambers, and/or apertures. A tape stencil can then be placed on a supporting substrate, between layers of tape, or between layers of other materials. In one embodiment, stencil layers can be stacked on each other. In this embodiment, the thickness or height of the channels can be varied by varying the thickness of the stencil (e.g. the tape carrier and the adhesive material thereon) or by using multiple substantially identical stencil layers stacked on top of one another. Various types of tape are useful with this embodiment. Suitable tape carrier materials include but are not limited to polyesters, polycarbonates, polytetrafluorethlyenes, polypropylenes, polyimides. Such tapes may have various methods of curing, including curing by pressure, temperature, or chemical or optical interaction. The thicknesses of these carrier materials and adhesives may be varied.

In another preferred embodiment, microfluidic devices according to the present invention are fabricated from materials such as glass, silicon, silicon nitride, quartz, or similar materials. Various conventional machining or micromachining techniques such as those known in the semiconductor industry may be used to fashion channels, vias, and/or chambers in these materials. For example, techniques including wet or dry etching and laser ablation may be used. Using such techniques, channels, chambers, and/or apertures may be made into one or more surfaces of a material or penetrate through a material.

Still further embodiments may be fabricated from various materials using well-known techniques such as embossing, stamping, molding, and soft lithography.

In addition to the use of adhesives or single- or double-sided tape discussed above, other techniques may be used to attach one or more of the various layers of microfluidic devices useful with the present invention, as would be recognized by one of ordinary skill in attaching materials. For example, attachment techniques including thermal, chemical, or light-activated bonding; mechanical attachment (such as using clamps or screws to apply pressure to the layers); or other equivalent coupling methods may be used.

A basic microfluidic three-way splitting device 10 is illustrated in FIGS. 1A–1B. The device 10 is composed of five sandwiched layers 11–15, each having a nominal thickness of approximately 6 mils (150 microns). The first layer 11 serves as a cover and defines a fluid inlet port 16; the second layer 12 defines a fluidic channel 17 for receiving fluid from the inlet port 16; the third layer 13 defines three vias 18 for receiving fluid from the channel 17 and conveying it to the fourth layer 14; the fourth layer 14 defines three channels 19, 20, 21 that receive fluid from the vias 18; and the fifth layer 15 defines three fluid outlet ports 22 each communicating with one of the channels 19, 20, 21. The channels 17, 19, 20, 21 are approximately 40–60 mils (1000–1500 microns) wide, and the vias 18 and ports 16, 22 may be fabricated with a nominal diameter of approximately 40–60 mils (1000–1500 microns). Notably, no regions of elevated flow resistance are associated with the downstream channels 19, 20, 21. Preferably, the second and fourth layers 12, 14 are formed of double-sided tape having a polymeric carrier material, although a wide variety of materials, bonding methods and configurations (including single- and double-sided tapes) may be used. For example, the first through fourth layers 11–14 may each be formed of single-sided adhesive tape.

In operation, fluid supplied to the device 10 through the inlet port 16 is eventually split into three different established flow streams that exit the device 10 through the outlet ports 22. However, although the aggregate volumetric flow rate through the three outlet ports 22 equals the flow rate through the inlet port 16, the exact proportion of the three split streams is difficult to predict. To begin with, the fluid path length through the right channel 21 is longer than the path length through the middle channel 20, which itself is longer than the path length through the left channel 19. In the absence of any manufacturing variances, the differing path lengths are expected to generate different flow resistances among the three paths. But in practice, manufacturing variances can be quite significant, and should not be ignored if precise splitting is desired. In a multi-layer device 10 such as illustrated in FIGS. 1A–1B, parameters including (but not limited to) channel width and layer alignment are subject to variation. Thus, even if the design for the device 10 specifies identical left, middle, and right, channels 19, 20, 21, upon manufacture these channels 19, 20, 21 are likely to have different characteristic flow resistances. In other words, in the absence of any regions of elevated flow resistance, it is difficult to predict the exact proportion by which an established flow of fluid will be split among the three channels 19, 20, 21.

II. Addition of Flow Resistance Regions to Microfluidic Devices

To facilitate more precise and predictable splitting in a microfluidic device, regions of permanently elevated flow resistance may be provided. Of the numerous possible ways by which flow resistance may be elevated, a few representative examples are discussed herein. As will be further discussed, methods of increasing flow resistance include altering the geometry (e.g., dimensions or configuration) of microfluidic structures such as channels or vias, and/or adding porous or other flow-reducing materials to fluid circuits. An elevated flow resistance region associated with a microfluidic channel or circuit in a splitting device may be placed at practically any position downstream of a splitting region so long as the elevated flow resistance region provides a tangible effect on established flow through the channel or circuit of interest. For example, an elevated flow resistance region associated with a particular channel or circuit may be disposed along an outlet port of a microfluidic splitting device or even within an external fluidic interface in fluidic communication with a microfluidic splitting device.

Preferably, the elevated flow resistance provided by an elevated flow resistance region applied to a channel or circuit in a microfluidic splitting device substantially exceeds the characteristic flow resistance of the particular channel or circuit so as to promote predictable splitting. To the extent that the characteristic flow resistance of a particular channel or circuit is subject to significant variation (such as due to manufacturing tolerances, etc.), one benefit of selecting flow resistance regions having significantly elevated flow resistances is the ability to minimize the effects of such variations in characteristic flow resistance. On the other hand, flow resistance provided by an elevated region is subject to a practical upper limit; namely, the microfluidic channel or circuit should still be able to permit fluid flow without requiring needlessly high pumping forces that may waste energy or negatively affect the integrity of the microfluidic device. Elevated flow resistance regions may be applied to one, multiple, or all channels or circuits in a microfluidic device. Depending on the particular application, preferably the flow resistance of at least one downstream channel or circuit in a microfluidic splitting device is permanently elevated by a factor of at least about 2 compared to its characteristic resistance to established flow. In other applications, flow resistance is permanently elevated by a factor of at least about 5, and in still another application, flow resistance is elevated by a factor of at least about 10. Even higher elevations are contemplated.

A. Adding Porous Regions

When porous materials are used, various methods may be used to apply such materials to a channel or fluid circuit. For example, porous materials may be inserted directly into a channel, or a layer of a microfluidic device may be comprised of one or more porous materials and positioned within a fluid circuit to permit flow through the porous layer. A wide variety of porous materials may be used in devices according to the present invention. Representative examples include, but are not limited to, porous varieties of: ultra-high molecular weight polyethylenes (UHMW PE), polytetrafluoroethylenes (PTFE), polycarbonates, and polyesters. These and other porous materials are readily available in various pore sizes and with various void volumes (relating to pore density). Notably, certain porous materials are available in multi-directional (including pores that permit fluid flow in multiple directions) and uni-directional (including pores that permit fluid flow in a single direction) forms. One method of obtaining uni-directional pores is track-etching. As for specific examples of porous materials, applicant is aware of polycarbonates and polyesters available in uni-directional (e.g., track-etched) form, and aware of PTFE and UHMW PE available in multi-directional form. Examples of sources for porous materials useful with the present invention include DeWAL Industries Inc. (Saunderstown, R.I.); Millipore Corp. (San Jose, Calif.); Porex Corp. (Fairburn, Ga.); and Whatman Inc. (Clifton, N.J.). To illustrate the different flow resistance characteristics of porous materials, porous polycarbonates sourced from Whatman Inc. and Millipore Corp. are rated as permitting water flow rates of 6, 18, 40, 1500, and 2000 liters/min/cm$^2$ at a pressure of 10 psi. These values are provided for illustration only; further porous materials having other flow characteristics are available.

1. Porous Material Layers

In a preferred embodiment, a microfluidic splitting device comprises one or more porous material layer regions that serve to permanently elevate flow resistance. Generally, these regions are configured to provide elevated flow resistance and permit flow in a direction across or substantially perpendicular to the plane of the layer regions.

Referring to FIGS. 2A–2B, a three-way microfluidic splitting device 30 is formed in seven layers 31–37. The first layer 31 defines a fluid inlet port 38; the second layer 32 defines a fluidic channel 39 that receives fluid from the inlet port 38; the third layer 33 defines three vias 40 for communicating fluid from the channel 39 to the fourth layer 34; the fourth layer 34 includes a composite of three porous material regions 41, 42, 43 each disposed below one of the three vias 40 in the third layer 33; the fifth layer 35 (identical to the third layer 33) defines three vias 44 that receive fluid passing through the porous material regions 41, 42, 43; the sixth layer 36 defines three channels 45, 46, 47 that receive fluid from the fourth layer vias 40; and the seventh layer 37 defines three fluid outlet ports 48 each communicating with one of the channels 45, 46, 47. Various materials may be used for the device layers 31–37, and while adhesives may be advantageously used to bond the layers, other bonding methods may be employed. The porous material regions 41, 42, 43 of the fourth layer 34 may be composed of materials having substantially the same flow resistance characteristics (e.g., if it is desirable to promote substantially even splitting between the three channels 45, 46, 47) or very different flow resistance characteristics (e.g., if it is desirable to promote substantially uneven splitting among the channels 45, 46, 47). Uni-directional (e.g. track-etched) porous materials with pores aligned in the direction of fluid travel may advantageously be used to prevent substantial lateral wicking of fluid as it is forced through the porous material regions 41, 42, 43. Although the entire layer 34 of the device 30 as illustrated in FIGS. 2A–2B is composed of porous materials, it is also possible to insert discrete porous regions in a non-porous stencil layer whereby the porous regions resist flow in a direction perpendicular to the layer 34.

In another preferred embodiment, multiple porous material regions are placed in series to aid in splitting microfluidic streams. Referring to FIGS. 3A–3B, a four-way microfluidic splitting device 50 is constructed from seven layers 51–57. Starting from the bottom, the first layer 51 defines an inlet port 58 and four outlet ports 60. The second layer 52 defines an L-shaped inlet channel 61, two distinct 'narrow-V' channels 62, and four vias 63. The third layer 53 defines a 'central' via 64 aligned with one end of the inlet channel 61, two vias 65 each disposed above an apex of a narrow-V channel 62 in the second layer 52, a medial group of four vias 66, and a lateral group of four vias 67. The fourth layer 54 is composed of four filter material regions 68–71, one region each disposed above the first via 64, the two apex vias 65, the medial group of four vias 66, and the lateral group of vias 67. The fifth layer 55 is identical to the third layer 53, defining a second central via 72, two vias 73, a medial group of four vias 74, and a lateral group of four vias 75. The sixth layer 56 defines a 'wide-V' channel 76 in fluid communication with the central via 72 and the two vias 73 in the fifth layer 55, and defines four disconnected parallel channels 77. The seventh layer 57 serves as a cover for the channels 76, 77 in the sixth layer 56. In operation, fluid introduced to the inlet via 58 flows through the L-shaped channel 61, the first central via 64, a first porous material region 68, the second central via 72, and into the wide-V channel 76 where the fluid flow is split into two portions. From the wide-V channel 76, each of the two split fluid streams flows downward though one of the two vias 73, through the second porous material region 69, through one of the two vias 65, and into an apex of one of the two narrow-V channels 62 where the stream is again split into two portions. The resulting four fluid streams flow upward through the narrow-V channels 62 through the medial group of vias 66 in the third layer 53, the third porous material region 70, the medial group of vias 74 in the fifth layer 53 and into the parallel channels 77. From the parallel channels 77, the four fluid streams flow downward through the lateral group of vias 75 in the fifth layer 55, a fourth porous material region 71, the lateral group of vias 67 in the third layer 53, the second layer vias 63, and finally the outlet ports 60. The effect of the various porous material regions 68–71 follows: the first porous region 68 is applied to the whole incoming stream and may assist in damping inlet-side pressure fluctuations; the second porous region 69 promotes precise and predictable splitting of the single fluid stream into two streams (by elevating flow resistance); the third porous region 70 promotes precise and predictable splitting of the two fluid streams into four streams (by the same principle); and the fourth porous region 71 may assist in damping any outlet-side pressure fluctuations. Thus, a microfluidic splitting device having multiple flow resistances in series is provided.

A microfluidic splitting device according to another preferred embodiment may be fabricated from materials such as glass, silicon, silicon nitride, quartz, or similar materials. These materials may be rigid. Referring to FIGS. 4A–4B, a microfluidic splitting device 80 is fabricated from a rigid first layer 81, central porous material regions 83, 84, and a rigid second layer 82. The first layer 81 includes an inlet via 85 in fluid communication with a first channel 86 provided in the upper surface 87 of the first layer 81. The second layer 82 includes two fluidic channels 88, 89 disposed in the lower surface 90, the channels 88, 89 extending from a position above the first channel 86 to two outlet vias 91, 92 provided in the second layer 82. The channels 86, 88, 89 and vias 85, 91, 92 may be formed using conventional machining or micromachining such as those known in the semiconductor industry, including, for example, etching and/or laser ablation. In operation, fluid introduced to the inlet via 85 flows to the first channel 86 and is split into the downstream channels 88, 89 through the porous material regions 83, 84. From the downstream channels 88, 89, the split fluid streams exit the device 80 through the outlet vias 91, 92. Depending on whether substantially even or substantially uneven splitting is desired, the porous material regions 83, 84 may be selected to have substantially the same or substantially different flow resistance characteristics. The first layer 81, central porous material regions 83, 84, and second layer 82 may be attached together using adhesives or other techniques discussed herein. In this manner, rigid materials can be used to fabricate a precise and predictable microfluidic splitting device.

2. In-Plane Porous Elements

In another preferred embodiment, a microfluidic splitting device comprises one or more in-plane porous elements (e.g., porous strips) that provide regions of permanently elevated flow resistance. These elements are referred to as "in-plane" because they are generally configured to provide elevated flow resistance and permit limited flow in a direction along or substantially within the plane of the element (as opposed to the porous material layer regions described above).

Referring to FIGS. 5A–5B, a four-way microfluidic splitting device 100 is formed in five layers 101–105. Starting from the bottom, the first layer 101 defines a fluid inlet port 107; the second layer 102 defines an inlet aperture 108, a fluidic trunk channel 109 that receives fluid from the aperture 108, and four branch channels 110 each in fluid communication with the trunk channel 109; the third layer 103 defines four vias 111 for communicating fluid from the branch channels 110 to the fourth layer 104; the fourth layer 104 defines four channels 112 into which in-plane porous elements 113 (e.g., porous strips) are inserted; and the fifth layer 105 defines four outlet ports 114 for receiving fluid from the four channels 112. The porous materials 113 preferably have multi-directional pores to provide filtering utility in the direction of the channel. For example, paper-based or nylon-based filter materials may be used. To eliminate or reduce leakage around the porous strips 113, preferably the strips 113 are sealed to their associated channels 112 using a hot-melt adhesive or other sealing materials. One example of a method for sealing an in-layer porous strip within a microfluidic channel is provided in the following steps: (1) providing a porous strip having dimensions approximately equal to the dimensions of a corresponding channel; (2) applying adhesive to the strip and/or the channel boundaries; (3) inserting the strip into the channel; and (if necessary) (4) activating the adhesive, such as by applying pressure or heating means. Equal-sized strips 113 made from the same porous materials or different materials may be used, depending on whether substantially equal or substantially different flows are desired through the four channels 112. Alternatively, as illustrated in FIG. 5C, strips 113A having different lengths may be used in the four channels 112 to provide different flow resistances among the channels. An in-plane element need not be the same dimensions (e.g. height and width) as a microfluidic channel into which it is inserted; it could be larger or smaller so long as some sealing means (e.g. a sealing material or interference fit, as described below) is provided.

3. Interference-Fit Porous Material Elements

In a further preferred embodiment, a microfluidic splitting device comprises one or more porous regions that are interference-fit into microfluidic chambers to provide elevated flow resistance regions while minimizing leakage past the porous regions. Referring to FIGS. 6A–6C, a two-way microfluidic splitting device 120 is formed in five layers 121–125. The first layer 121 defines a fluid inlet port 126. The second layer 122 defines an upstream fluidic channel 127, a splitting region 128, and two downstream channels 130 terminating in large apertures 132. The third layer 123 defines small vias 134 (i.e. preferably smaller than the porous material elements 139, 140) aligned with the apertures 132, 136 in the second and fourth layers 122, 124 and further aligned with porous material elements 139, 140 placed into the fourth layer 124. The fourth layer 124 defines chambers 136 for accepting porous material sections 139, 140, the chambers 136 being aligned with the vias 134 and each having a channel 137 for communicating fluid to an oversized channel terminus 138. The fifth layer 125 defines outlet ports 141 in fluid communication with the channel termini 138 in the fourth layer 124. Preferably, the porous material elements 139, 140 are thicker than the fourth layer 124, and the third layer 123 is formed of a flexible polymeric material such as, for example, 2-mil thick polypropylene. The thickness of the porous elements 139, 140 preferably exceeds the thickness of the fourth layer 124 by approximately 10–60%, but preferably is not so thick as to cause the third layer 123 to contact the first layer 121. Because the height of the porous material elements 139, 140 is greater than the height of the fourth layer 124, the third layer material 123 above the porous elements 139, 140 are pressed tightly against the porous elements 139, 140. Materials such as 1-mil thickness polypropylene tape with an integral 2.4 mil thickness layer of rubber-based adhesive have been used for the second and fourth layers 122, 124, although various other materials may be readily used.

The assembled device 120 is shown in FIG. 6B, a portion of which (along section lines 142–143) is shown in sectional view in FIG. 6C. In operation, fluid enters the device 120 through the inlet port 126 and is thereafter split in the splitting region 128 and directed to the downstream channel apertures 132 in the second layer 122. From the second layer apertures 132, fluid flows through the third layer vias 134 into the porous material sections 139, 140. If sufficiently small in size, the third layer vias 134 may provide some elevated flow resistance. Typically, however, the porous material elements 139, 140 are far more effective at elevating flow resistance for the fluid paths downstream of the splitting region 128. From the porous material sections 139, 140, the split fluid streams flow from the chambers 136 through the channels 137 and termini 138 to the outlet ports 141. The configuration of the device 120 prevents leakage in two ways: the flexible layer 123 is pressed tightly against the porous elements 139, 140, and any elevated fluid pressure that builds upstream of the porous elements 139, 140 also pushes the flexible layer 123 even tighter against the porous elements 139, 140. Preferably, porous material sections 139, 140 having multi-directional pores are used. Additionally, the different porous material sections 139, 140 may be composed of substantially the same or substantially different porous materials, depending on whether substantially even or substantially uneven fluid splitting is desired. While the particular porous elements 139, 140 and surrounding chambers 136 are illustrated as roughly circular in shape in FIGS. 6A–6B, other shapes may be employed. As discussed previously, various materials may be used for the layers of the device 120, and various bonding techniques may be employed to promote their attachment.

4. Beads

In a further embodiment, a microfluidic splitting device comprises a plurality of beads or other insoluble materials associated with channels downstream of the splitting region to provide elevated flow resistance regions. The use of beads with fluidic streams is well known in the filtering, chromatographic, and combinatorial chemistry arts. Examples of bead types that may be used with the present invention include: silica, glass, and polymeric beads. Such beads may be porous or nonporous in nature. These beads may also serve as ion exchange resins. Depending on whether substantially even or substantially uneven fluid splitting is desired, beads of the same or different sizes, and/or bead fill regions of the same or different lengths, may be employed. Beads may be introduced into microfluidic splitting devices by various conventional methods, including physical placement during fabrication or flowing a slurry of beads after fabrication is complete and then evaporating the slurry carrier liquid. In either instance it is preferable to include a "trap" region (e.g. a porous material) downstream of each bead region to prevent the beads from escaping the device upon the introduction of a subsequent fluid.

5. Monolithic Columns

Another method for generating a flow resistance region within a microfluidic channel is to chemically manufacture a porous monolithic region in place. A porous monolithic region composed of a macroporous crosslinked material will have a permanent porous structure providing resistance to fluid flow. The resulting flow resistance can be controlled by (1) varying the pore size, and/or (2) varying the length of the porous region to be encountered by the fluid. Smaller pores and/or longer porous regions resist fluid flow more than larger pores and/or shorter porous regions.

One method of chemically manufacturing such a flow resistance region involves polymerizing a solution in a microfluidic channel. Polymerization of solutions to yield porous regions are well-known in the arts of capillary electrochromatography, where such porous materials are used as stationary phase to effect separation of various analytes. Typically, a mold is filled with a "pre-monolith" mixture comprised of a cross-linking monomer, comonomers, an initiator, and a progenic solvent. Upon polymerization, a porous monolith that conforms to the shape of the mold is obtained. Various activation means, including thermal and photochemical means, may be used with such a process. Typically, such a solution is polymerized in pre-treated glass capillary tubes or glass channels. The pre-treatment functionalizes the silica so that the ensuing polymer will be covalently linked to the wall.

Pore structure of the monolith is sensitive to very small changes in the composition of the progenic solvent (which may be solvating or non-solvating in nature). A carefully chosen ternary solvent mixture can be used to allow for fine control of the porous properties of the monolithic column. Pore size may also be controlled by addition of a suitable chain transfer agent. Additionally, the following parameters may be used to control the porous properties of the resulting monolithic material: the percentage of a cross-linker, reaction temperature, and initiator concentration.

Referring generally to FIGS. 7A–7E, microfluidic devices (e.g. devices 150, 170) having monolithic flow resistance regions may be generated within microfluidic channels using photomasks and an activation source. Starting with a microfluidic splitting device identical to device 10 provided in FIGS. 1A–1B, a pre-monolith mixture is supplied to the device 150 or 170 to fill the channels 159–161 or 179–181. Separately, a photomask is prepared to overlay the device 150 or 170 containing the pre-monolith. Examples of representative photomasks 190, 200 are provided in FIGS. 7A–7B. The photomask 190 shown in FIG. 7A includes an opaque, preferably absorptive material 191 defining a single wide window 192. The photomask 200 shown in FIG. 7B includes three narrow windows 202, 203, 204 of varying length defined in the absorptive material 201. A sectional view of a photomask (e.g., mask 190 or 200) applied to a microfluidic splitting device (e.g., device 150 or 170) containing a pre-monolith mixture is illustrated in FIG. 7C. A light source 205 supplies light, preferably ultraviolet light, to any region(s) of the microfluidic device 150 or 170 left uncovered by any window(s) in the photomask 190 or 200 so as to locally polymerize the mixture within one or more microfluidic channels. Following the polymerization step, any remaining unpolymerized pre-monolith mixture may be rinsed from the device 150 or 170. FIGS. 7D–7E illustrate microfluidic devices 150, 170 that may be generated using the photomasks 190, 200 of FIGS. 7A–7B. The splitting device 150 of FIG. 7D includes three equal-length porous regions 163, 164, 165 so as to provide substantially equal flow resistances between the three channels 159, 160, 161. Following polymerization of the porous regions 163, 164, 165, an established flow of fluid provided to the splitting device 150 through the inlet port 156 is split substantially equally among the three channels 159, 160, 161 and then exits the device 150 through exit ports 162.

In contrast, the microfluidic splitting device 170 of FIG. 7E includes three unequal-length porous regions 183, 184, 185 so as to provide substantially unequal flow resistances between the channels 179, 180, 181. Following polymerization of the porous regions 183, 184, 185, an established flow of fluid provided to the splitting device 170 through the inlet port 176 is split into substantially unequal proportions among the three channels 179, 180, 181 and then exits the device 170 through exit ports 182.

Applicants have prepared porous polymeric monoliths in polypropylene microfluidic channels similar to those provided in the devices 150, 170 (in FIGS. 7D–7E). All of the starting materials used for the procedure were obtained from Sigma-Aldridge Corp. (Milwaukee, Wis.) and used as received. First, a casting solvent was prepared by mixing ethanol (20%), MeCN (60%), and 5 mM phosphate buffer, pH 6.8 (20%). Next, 5 mg of 2,2' azobisisobutyronitrile (AIBN) radical initiator, 297 microliters of 1,3 butanediol acrylate (BDDA), 685 microliters of butylacrylate, and 3 microliters of (Dow Corning) z-6030 adhesion promoter were dissolved in 2 ml of the casting solvent. The resulting mixture was sonicated for 5 minutes. The mixture was then drawn into a syringe and injected into a microfluidic channel. A mask was then applied to the microfluidic device to permit localized light exposure. Next, the masked microfluidic device was exposed to ultraviolet radiation (a 365 nm, 1 J/cm$^2$ source was used) for approximately 1 hour without any additional heating. An opaque white-colored porous monolith resulted in the microfluidic channel. The channels were subsequently washed with acetonitrile to flush out any unreacted monomer solution remaining in the channel behind the masked regions. The resulting monolith provided measurable resistance to fluid flow.

For further details on preparing polymeric monolithic columns, see Ngola, S. M., Fintschenko, Y., Choi, W., Shepodd, T. J., "Conduct-as-Cast Polymer Monoliths as Separation Media for Capillary Electrochromatography," Anal. Chem. 2001, Vol. 73, pp. 849–856, which is incorporated herein by reference.

One enhancement to the foregoing method for polymerizing a solution in a polypropylene channel includes surface treatment of the polypropylene to promote adhesion between the monolith and the channel surfaces. Preferable treatment methods include corona discharge, flame treatment, vacuum plasma (utilizing nitrogen and oxygen); air plasma (using atmospheric air), fluorination, addition of 0.025% malic acid to polypropylene; infrared laser (2% carbon black) treatment; AgII electrolysis; and chromic acid treatment. Each of these methods may provide different degrees of surface modification. Monoliths polymerized in treated channels are expected to provide greater flow resistance as compared to monoliths prepared in untreated channels. For further details on such surface treatment methods, see "Characterisation and Comparision of Surface Modification on Homopolymer Polypropylene" M. D. Green, F. J. Guild and R. D. Adams. A conference paper published in the proceedings of the 23rd Annual Meeting of the Adhesion Society, Myrtle Beach, S.C., USA. Feb. 20–23, 2000. (pg 541–543).

In an alternative embodiment, thermal conditioning of a sol-gel solution may be used to generate flow resistance regions within microfluidic devices. Generally, a sol-gel process involves the transition of a system from a liquid "sol" (mostly colloidal) to a solid "gel" phase for making ceramic or glass materials. The starting materials used in preparing the "sol" are usually inorganic or metal salts or metal organic compounds such as metal alkoxides. In a typical sol-gel process, the precursor is subjected to a series of hydrolysis and polymerization reactions to form a colloidal suspension, or a "sol." When the "sol" is cast into a mold, a wet "gel" will form. With further treatment, such as heating and drying, the "gel" is converted into ceramic or glass articles.

As applied to a microfluidic device, a thermally-activated sol-gel solution may be flowed into one or more channels or regions and then converted to solid or "gel" phase to serve as flow resistance regions. For example, a sol-gel solution may be prepared by mixing tetramethyl orthosilicate (TMOS), octadecyl trimethoxysilane (C-18TMOS); phenyldimethylsilane (PheDMS), and trifluoroacetic acid (TFA). Upon the application of heat to the solution contained in the device, a porous sol-gel region results. For further details on one example of preparation sol-gels, see Hayes, J. D., Malik, A., "Sol-Gel Monolithic Columns With Reversed Electroosmotic Flow for Capillary Electrochromatography," Anal. Chem. 2000, Vol. 72, pp. 4090–4099, which is incorporated herein by reference.

B. Modifying Fluidic Channel or Circuit Geometry

There exist various ways of modifying the geometry of a portion of fluidic channel or circuit to elevate flow resistance. For example, channel sections may be reduced in height and/or width upon initial fabrication of channels, or capillaries of selectable dimensions may be added to existing channels. Geometric interfaces between channels may also be tailored to elevate flow resistance, such as by providing only a partial overlap between adjacent layers, or by including flow-limiting via or slit between non-adjacent layers. Following are a few examples of methods for modifying the geometry of fluidic channels or circuits to elevate flow resistance.

1. Altering Dimensions of Channel Sections

In a preferred embodiment, channel sections have reduced dimensions to permanently elevate flow resistance. For example, referring to FIGS. 8A–8B, a three-way microfluidic splitting device 220, formed in five layers and similar to the device 10 in FIGS. 1A–1B, is shown. The first layer 221 serves as a cover and defines a fluid inlet port 226; the second layer 222 defines a fluidic channel 227 for receiving fluid from the inlet port 226; the third layer 223 defines three vias 228 for receiving fluid from the channel 227 and conveying it to the fourth layer 224; the fourth layer 224 defines three channels 229, 230, 231 each having a narrowed region 229A, 230A, 231A; and the fifth layer 225 defines three fluid outlet ports 232 each communicating with one of the channels 229, 230, 231. Notably, the narrowed regions 229A, 230A, 231A have the same width but vary in length to elevate the flow resistances of each channel 229, 230, 231 to different levels. Each flow resistance region 229A, 230A, 231A is preferably at least about as long as the largest single channel cross-sectional dimension (e.g. at least as long as the greater of the height or the width of channels 249, 250, 251), more preferably between about 2–100 times this length, and even more preferably between about 325 times this length. The longest narrowed region 231A provides the greatest flow resistance elevation (thus permitting the least flow of the three channels 229–231), while the shortest narrowed region 229A provides the least flow resistance elevation (thus permitting the greatest flow of the three channels 229–231). Preferably, narrowed regions 229A, 230A, 231A have widths less than about 50% of the widths of channels 229, 230, 231. For example, channels 229, 230, 231 may be approximately 60 mils (1500 microns) wide, and the narrowed regions may have widths in the range of 10–30 mils (250–750 microns). These dimensions are provided for illustration only, as other dimensions may be used. In operation, a single established fluid flow is provided to the device 220 through the inlet port 226, traverses the channel 227, and is split into three streams in channels 229, 230, 231. The resulting flow rate through each of the channels 229, 230, 231 is inversely proportional to the flow resistance for each channel. Thus, flow will be greatest through the left channel 229, less through the center channel 230, and lesser still through the right channel 231 due to the effects of the elevated flow resistance regions 229A, 230A, 231A. The streams exit the device 220 th rough exit ports 232.

In another preferred embodiment, different channel regions may be narrowed by different amounts to provide different flow resistances. Referring to FIG. 8C, a 3-way microfluidic splitting device 240 similar to device illustrated in FIGS. 8A–8B but including flow resistance of different widths associated with only two of the three downstream channels. A single established flow is provided to the device through an inlet port 246, traverses a channel 247, and is split into three separate channels 249, 250, 251. The left channel 249 is unmodified with no elevated flow resistance region; the center and right channels 250, 251 have reduced-width flow resistance regions 250A, 251A. As illustrated, the un modified portions of the three channels 249–251 have substantially equal dimensions. The width of the central flow resistance region 249A is approximately 50 percent of the width of the channel 250, and the width of the right flow resistance region 251A is approximately 25 percent of the width of the channel 251. The resulting flow through the three channels 249, 250, 251 is split with the greatest percentage through the left channel 249, a lesser percentage through the center channel 250, and a lesser percentage still through the right channel 251, in inverse proportion to the flow resistances for each of the three fluid circuits. The three split fluid streams exit the device through exit ports 252.

In a further embodiment, sections of channels or fluid circuits in a microfluidic device are modified to provide elevated flow resistance by reducing the height of these sections. One method for achieving particularly high flow resistance levels according to this embodiment is to intentionally collapse a microfluidic channel in a multi-layer polymeric device. Surprisingly, collapsed channels according to certain designs still permit the passage of fluid therethrough, although with drastically reduced flow area. Referring to FIGS. 9A–9C, showing a microfluidic device 260 defining a single channel 266, it is believed that if a microfluidic channel 266 is bounded from above by an upper layer 261, from the sides by a central stencil layer 262, and from below by a lower layer 263, then voids (e.g. smaller channels) result when the upper and lower layers 261, 263 are forced into contact along the channel 266. If the upper and/or lower layers 261, 263 are coated with an adhesive on a surface internal to the channel 266, then contact between the layers 261, 263 may be permanently maintained. Factors affecting the flow area (and also the flow resistance) of the resulting void channels 269, 270 include: (1) the thickness of the central layer 262, (2) the width of the initial channel 266 defined in the central layer 262, and (3) the flexibility of the collapsing (e.g. upper 261 and/or lower 261) layer(s).

While a wide variety of materials, dimensions, and configurations may be used to produce a collapsed microfluidic channel for providing increased (but not infinite) flow resistance, one illustrative example follows. A rigid polycarbonate substrate was used as a lower (support) layer 263. The central stencil layer 262 and top cover layer 261 were formed of single-sided adhesive tape (3M, St. Paul, Minn.) composed of a 4 mil (100 micron) polyester carrier with a 0.8 mil (20 micron) acrylic adhesive on one side. A 40-mil (1 millimeter) wide channel 266 was cut through the central layer 262 with a computer-controlled laser cutter. The top layer 261 defined an inlet and an outlet port 264, 265 disposed above the ends of the central layer channel 266. The three layers 261–263 were sandwiched, with the adhesive side of the central and top layers 262, 261 facing downward. Upon assembly, the top layer 261 was manually depressed with light downward pressure to collapse the channel 266, apparently forming two void channels 269, 270. Following collapse of the primary channel 266, a pressurized dye solution applied to the device 260 with a syringe flowed from the inlet port 264 to the outlet port 265. The foregoing method for producing collapsed channels may be applied to a microfluidic splitting device such as the device 10 illustrated in FIGS. 1A–1B to elevate flow resistance of one or more channels.

2. Inserting Capillaries into Microfluidic Channels

In another preferred embodiment, capillaries (capillary tubes) are inserted into microfluidic channels to serve as flow resistance regions. For example, glass capillaries having various internal dimensions (including graduated capillaries with 1 microliter increments) are readily available from several sources. One advantage of using capillaries is that they are generally characterized by precise internal dimensions, thus providing repeatable resistance to established fluid flow. One method for inserting a capillary into a microfluidic device may be explained by referring to FIGS. 5A–5B. There, capillaries 113 may be substituted for the porous materials 113 and inserted into the channels 112. Preferably, capillaries having flat outer surfaces (e.g. a capillaries having square external cross-sections) are used, although capillaries having round or other external cross-sections may be used. To promote sealing between a capillary 113 and a surrounding channel 112 (so as to minimize fluid leakage around the capillary), a sealing material such as hot-melt adhesive may be used to coat the capillary 113 and seal it to the channel 112 during fabrication of the splitting device 100. Other adhesives, including but not limited to pressure-sensitive adhesives, may also be used to promote sealing. Flow resistance of individual channels or fluid circuits may be selectively elevated by selecting capillaries of different internal dimensions and/or different lengths (as illustrated in FIG. 5C, varying-length capillaries 113A may be substituted for the porous materials 113A and inserted into the channels 112 of the device 100).

3. Modifying Interfaces Between Channels

In an alternative embodiment, interfaces between channels in a microfluidic splitting device may be modified to serve as elevated flow resistance region. Compared to the previously-described methods for elevating flow resistance, in most configurations it is generally more difficult to achieve substantial increases in flow resistance solely by altering channel interfaces. It is believed that this difficulty is related to the relatively short region of elevated flow resistance experienced by fluid flowing therethrough.

The device 10 illustrated in FIGS. 1A–1B may be considered as a 'baseline' case in which the upstream or inlet channel 17 fully overlaps the downstream or outlet channels 19, 20, 21 (with intermediate vias 18) and there exists relatively little flow resistance between the upstream 17 and downstream channels 19, 20, 21. With some modification to the device 10, elevated flow resistance regions may be created along these interfaces.

In one embodiment flow resistance regions may be formed in an intermediate layer along the overlap between channels disposed in different layers. For example, referring to FIGS. 10A–10B, a three-way microfluidic splitting device 300, formed in five layers and similar to the device 10 in FIGS. 1A–1B, is shown. The first layer 301 serves as a cover and defines a fluid inlet port 306. The second layer 302 defines a fluidic inlet channel 307 for receiving fluid from the inlet port 306. The third layer 303 defines three small apertures 308 disposed between the inlet channel 307 and three downstream or outlet channels 319, 310, 311 defined in the fourth layer 304. The fifth layer 305 defines three fluid outlet ports 312 each communicating with one of the channels 309, 310, 311. One or multiple apertures may be provided for each channel interface.

The apertures 308 are sized to provide measurably elevated resistance to established flow. While the apertures 308 specifically illustrated in FIGS. 10A–10B are configured as narrow slits, the apertures 308 may be provided in other shapes and configurations, including but not limited to round or rectangular shapes. If larger flow resistances are desired, hole sizes down to approximately 1 mil (25 microns) may be made by laser ablation through most polymeric materials by micromachining specialists such as Spectralytics (Minneapolis, Minn.). Much smaller apertures may be formed by silicon etching techniques such as electron-beam lithography and etching. If configured as slits, then the apertures 308 are preferably formed by slicing through regions of the third layer material with a cutting blade, such as a computer-controlled cutter that may be formed by adapting a blade to a standard image plotter. In other embodiments, apertures may be formed by laser cutting, die cutting, or other known methods for removing or slicing material. The dimensions of the aperture 308, including the thickness of the third layer 303 and the length and width (limited at smaller dimensions by the sharpness of the blade) dimensions of the aperture may affect flow resistance characteristics. The flexibility of the material layer 303 defining the aperture 308 may also affect flow resistance since deflection of the layer 303 under elevated pressure may increase the flow area through the aperture 308. Notably, the apertures 308 associated with each downstream channel 319, 310, 311 may be sized to provide substantially the same flow resistance, or sized to provide substantially different flow resistance levels. In operation, a single established flow provided to the device 300 is split into three separate streams in channels 309, 310, 311, with the proportion of flow in each channel dependent on the flow resistance provided by its associated aperture 308.

In a further alternative embodiment, flow resistance regions may be formed by adjusting the overlap between channels disposed in adjacent layers. For example, referring to FIGS. 11A–11B, a three-way microfluidic splitting device 320 formed in four layers is shown. The first layer 321 defines an inlet port 325; the second layer 322 defines an upstream or inlet channel 327; the third layer 323 defines three downstream or outlet channels 328, 329, 330 in fluid communication with the inlet channel 327; and the fourth layer 324 defines three outlet ports 331, one each corresponding to the outlet channels 328–330. Notably, outlet channels 328, 329, 330 are positioned relative to the inlet channel 327 to provide only partial overlaps, each having small reduced flow areas, at overlap regions 338, 339, 340. These overlap regions 338–340 elevate the flow resistance associated with each channel 338–340 so as to control splitting of established flows between the channels. If the overlap regions 338–340 are substantially equal in flow area, then an established flow to the device 320 may be split into approximately equal portions in channels 328, 329, 330. Alternatively, with adjustments to overlap areas, the overlap regions 338–340 may impart different flow resistances to split an established flow into unequal portions in channels 328, 329, 330. For the overlap regions 338–340 to elevate the flow resistances of the fluid circuits including the channels 328–330, then the regions 338–340 should have flow areas substantially smaller than the nominal flow areas of the remainder of the fluid circuits. While this embodiment may be used to generate measurably elevated flow resistance, previously-described methods may advantageously be used if substantially higher levels of elevated flow resistance are desired.

C. Combining Methods for Elevating Flow Resistance

As will be evident to one skilled in the art, a variety of the previously-described methods for elevating flow resistance may be combined to produce even higher flow resistance. Combinations include multiple porous regions provided in series, porous regions coupled with changes in channel or circuit geometry, or multiple channel or circuit geometry changes provided in series. Just one of the many possible examples would be the inclusion of a porous region in a flow-limiting capillary embedded in a microfluidic channel. A wide variety of other possible combinations are contemplated.

It is to be appreciated that the foregoing description of the invention has been presented for purposes of illustration and explanation and is not intended to limit the invention to the precise manner of practice herein. It is to be appreciated, therefore, that changes may be made by those skilled in the art without departing from the spirit of the invention, and that the scope of the invention should be interpreted with respect to the following claims and their legal equivalents.

What is claimed is:

1. A method for splitting an established flow of liquid among a plurality of microfluidic channels, the method comprising the steps of:

providing a microfluidic upstream channel;

providing at least a first microfluidic downstream channel having a first characteristic resistance to established flow and a second microfluidic downstream channel having a second characteristic resistance to established flow, the first downstream channel and the second downstream channel being in fluid communication with the upstream channel;

permanently elevating the flow resistance of the first downstream channel by at least about two times the first characteristic flow resistance;

permanently elevating the flow resistance of the second downstream channel by at least about two times the second characteristic flow resistance;

passively governing flow of a first portion of the liquid through the first downstream channel with the first elevated flow resistance region; and passively governing flow of a second portion of the liquid through the second downstream channel with the second elevated flow resistance region.

2. The method of claim 1 wherein the flow resistance of the first downstream channel is elevated by at least about five times the first characteristic flow resistance, and the flow resistance of the second downstream channel is elevated by at least about five times the second characteristic flow resistance.

3. The method of claim 1 wherein, following the permanent elevation steps, the flow resistance of the first downstream channel is substantially equal to the flow resistance of the second downstream channel.

4. The method of claim 1 wherein, following the permanent elevation steps, the flow resistance of the first downstream channel is substantially different from the flow resistance of the second downstream channel.

5. The method of claim 1 wherein the flow resistance of the first downstream channel is permanently elevated using a porous material.

6. The method of claim 5 wherein the upstream channel is defined in a first device layer, the first downstream channel is defined in a second device layer, the porous material comprises a porous layer, and the flow resistance of the first downstream channel is elevated by inserting the porous layer between the first device layer and the second device layer.

7. The method of claim 1 wherein the flow resistance of the first downstream channel is permanently elevated by altering the channel geometry of at least a portion of the first downstream channel.

8. The method of claim 1 wherein the flow resistance of the first downstream channel is permanently elevated by collapsing at least a portion of the first downstream channel.

9. The method of claim 1 wherein the flow resistance of the first downstream channel is permanently elevated by providing a flow-limiting aperture between the upstream channel and the first downstream channel.

10. The method of claim 1 wherein the upstream channel is disposed in a first device layer, the first downstream channel is disposed in a second device layer, and the flow resistance of the first downstream channel is elevated by providing a flow-limiting overlap region between the upstream channel and the first downstream channel.

11. The method of claim 1 further comprising the steps of:

providing a third microfluidic downstream channel having a third characteristic resistance to established flow, the third downstream channel being in fluid communication with the upstream channel;

permanently elevating the flow resistance of the third downstream channel by at least about two times the third characteristic flow resistance; and passively governing flow of a third portion of the liquid through the third downstream channel with the third elevated flow resistance region.

12. A device for predictably splitting a first established microfluidic liquid stream into a plurality of portions, the device comprising:

an upstream microfluidic channel;

a first downstream microfluidic channel in fluid communication with the upstream channel, the first downstream channel having a first characteristic flow resistance;

a second downstream microfluidic channel in fluid communication with the upstream channel, the second downstream channel having a second characteristic flow resistance;

a first elevated flow resistance region associated with the first downstream channel, the first elevated flow resistance region providing a permanently elevated resistance to established flow that is substantially greater than the first characteristic flow resistance; and a second elevated flow resistance region associated with the second downstream channel, the second elevated flow resistance region providing a permanently elevated resistance to established flow that is substantially greater than the second characteristic flow resistance;

wherein the first downstream channel and the second downstream channel are adapted to remain completely filled with liquid while the first established liquid stream is present in the upstream channel; and wherein flow through the first downstream channel is governed by the first elevated flow resistance region and flow through the second downstream channel is governed by the second elevated flow resistance region.

13. The device of claim 12 wherein the first elevated flow resistance region provides a flow resistance at least about two times greater than the first characteristic flow resistance.

14. The device of claim 12 wherein the first elevated flow resistance region provides a flow resistance at least about five times greater than the first characteristic flow resistance.

15. The device of claim 12 wherein the first elevated flow resistance region provides a flow resistance at least about ten times greater than the first characteristic flow resistance.

16. The device of claim 12 wherein at least one of the first elevated flow resistance region and the second elevated flow resistance region includes a porous material.

17. The device of claim 16 wherein the porous material is selected from the group consisting of: a sandwiched porous device layer, an interference-fit porous element, an in-plane porous element, a porous polymerized material, a porous sol-gel, and a plurality of beads.

18. The device of claim 12 wherein the device is a multi-layer microfluidic device, the upstream channel being disposed in a first device layer and at least one of the first downstream channel and the second downstream channel is disposed in a second device layer.

19. The device of claim 18 wherein:
the first device layer is a first sandwiched stencil layer having a thickness, the upstream channel being defined through the entire thickness of the first stencil layer; and
the second device layer is a second sandwiched stencil layer having a thickness, at least one of the first downstream channel and the second downstream channel being defined through the entire thickness of the second stencil layer.

20. The device of claim 18, further comprising a third device layer disposed between the first device layer and the second device layer.

21. The device of claim 20 wherein the third device layer comprises a porous material.

22. The device of claim 20 wherein the first elevated flow resistance region includes a flow-limiting aperture defined in the third device layer.

23. The device of claim 12 wherein the device is formed with a plurality of device layers, and at least one of the upstream channel, the first downstream channel, and the second downstream channel is formed with a micromachining technique in a surface of at least one device layer of the plurality of device layers.

24. The device of claim 12 wherein the first elevated flow resistance region is formed by altering the channel geometry of at least a portion of the first downstream channel.

25. The device of claim 24 wherein the first elevated flow resistance is characterized by a reduced cross-sectional flow area.

26. The device of claim 12 wherein the first elevated flow resistance region includes a flow-limiting aperture disposed between the upstream channel and the first downstream channel.

27. The device of claim 12 wherein the first elevated flow resistance region includes a capillary.

28. The device of claim 12 wherein the first elevated flow resistance region includes a collapsed channel section.

29. The device of claim 12, further comprising:
a third downstream microfluidic channel in fluid communication with the upstream channel, the third downstream channel having a third characteristic flow resistance; and
a third elevated flow resistance region associated with the third downstream channel, the third elevated flow resistance region providing a permanently elevated resistance to established flow that is substantially greater than the third characteristic flow resistance;
wherein the third downstream channel is adapted to remain completely filled with liquid while the upstream channel contains the first established liquid stream; and
wherein flow through the third downstream channel is governed by the third elevated flow resistance region.

30. A multi-layer microfluidic device for splitting a first established liquid stream into a plurality of portions, the device comprising:
a microfluidic upstream channel defined in a first device layer;
a first and a second microfluidic downstream channel in fluid communication with the upstream channel, the first downstream channel having a first characteristic resistance to established flow and the second downstream channel having a second characteristic resistance to established flow, with at least one of the first and the second downstream channel being defined in a second device layer;
a first permanently elevated flow resistance region associated with the first downstream channel, the first elevated flow resistance region providing a flow resistance substantially greater than the first characteristic flow resistance and governing a portion of the first established liquid stream received by the first downstream channel; and
a second permanently elevated flow resistance region associated with the second downstream channel, the second elevated flow resistance region providing a flow resistance substantially greater than the second characteristic flow resistance and governing a portion of the first established liquid stream received by the second downstream channel;
wherein the first and the second downstream channel are adapted to remain completely filled with liquid while the first established liquid flow is present in the upstream channel.

31. The device of claim 30 wherein the first device layer and the second device layer comprise sandwiched stencil layers.

* * * * *

UNITED STATES PATENT AND TRADEMARK OFFICE
CERTIFICATE OF CORRECTION

PATENT NO. : 6,499,499 B2  
DATED : December 31, 2002  
INVENTOR(S) : Dantkser, Eugene et al.

It is certified that error appears in the above-identified patent and that said Letters Patent is hereby corrected as shown below:

Column 1,  
Line 62, the phrase "generated to push, the fluid past" should read -- generated to push the fluid past --

Column 15,  
Line 53, the phrase "exit the device 220 th rough exit ports" should read -- exit the device 220 through exit ports --  
Line 57, the phrase "splitting device 240 similar to device illustrated" should read -- splitting device 240 similar to the device illustrated --  
Line 66, the phrase "the un modified portions" should read -- the unmodified portions --

Column 17,  
Lines 6 and 7, the phrase "(e.g. a capillaries" should read -- (e.g. capillaries --  
Line 25, the phrase "elevated flow resistance region." should read -- elevated flow resistance regions. --

Signed and Sealed this

Fifteenth Day of June, 2004

JON W. DUDAS  
*Acting Director of the United States Patent and Trademark Office*